United States Patent [19]

Jones

[11] 4,277,812

[45] Jul. 7, 1981

[54] EXCESS VOLTAGE ARRESTER

[75] Inventor: Raymond D. Jones, Cheam, England

[73] Assignee: TII Industries, Inc., Copiague, N.Y.

[21] Appl. No.: 47,038

[22] Filed: Jun. 11, 1979

[51] Int. Cl.³ .............................................. H02H 3/22

[52] U.S. Cl. .................................... 361/119; 361/120; 361/129

[58] Field of Search ............... 361/117, 119, 120, 129, 361/130; 313/188, 306, 307, 325

[56] References Cited

U.S. PATENT DOCUMENTS

| | | | |
|---|---|---|---|
| 1,490,105 | 4/1924 | Greene | 361/129 X |
| 2,449,967 | 9/1948 | Jones | 313/188 |
| 2,830,216 | 4/1958 | Laurin | 361/120 X |
| 2,967,256 | 1/1961 | Rees | 361/129 X |
| 3,289,027 | 11/1966 | Jones | 361/120 X |
| 4,009,422 | 2/1977 | Woodfill | 361/129 X |
| 4,074,338 | 2/1978 | Simokat | 361/129 |
| 4,156,886 | 5/1979 | Jones | 361/120 |

FOREIGN PATENT DOCUMENTS

| | | | |
|---|---|---|---|
| 376302 | 5/1923 | Fed. Rep. of Germany | 361/117 |

*Primary Examiner*—Harry E. Moose, Jr.
*Attorney, Agent, or Firm*—Martin Sachs

[57] ABSTRACT

A highly reliable gas tube arrester capable of protecting both the input and output lines from an excess voltage appearing thereon, includes a hermetically sealed housing, having a plurality of electrodes affixed therein and spaced in a predetermined manner between themselves and the housing to provide a plurality of spark gaps. A breakdown of any one of the spark gaps will ionize a gas disposed within the housing providing a low impedance path between all of the electrodes to the housing which is normally connected to ground potential.

17 Claims, 10 Drawing Figures

EXCESS VOLTAGE ARRESTER

BACKGROUND OF THE INVENTION

1. Field of the Invention

The present invention relates to lightning arresters, and in particular, to excess voltage arresters capable of protecting a plurality of electrical signal lines.

2. Description of the Prior Art

The prior art abounds with lightning arresters, which generally are very bulky and may be utilized for only the protection of one or two lines. Typical of this type of gas filled arrester is the U.S. Pat. No. 3,289,027 issued to R. D. Jones on Nov. 29, 1966.

Attempts to provide a multi-element surge arrester to protect equipment connected to a plurality of lines, e.g. the input and output lines coupled to a repeater or other multi-terminal intermediate equipment which has both input and output circuits, are exemplified by U.S. Pat. No. 4,074,338 issued to F. L. Simokat on Feb. 14, 1978. This type of device tends to be rather bulky and often inconvenient for mounting into equipment due to its elongated shape.

A potentially more compact type of multi-element surge arrester is disclosed in U.S. Pat. No. 3,312,868 issued to V. W. Vodicka on Apr. 4, 1967. However, the type of construction disclosed therein utilizes a conducting metal electrode disposed within a ceramic insulator. The metallic electrode is spaced from a ground metallic terminal forming the protective spark gap. When an electrical surge voltage such as lightning occurs, the excessive current is carried to the metallic electrode, across the spark gap to the ground terminal. The excessive current flowing in the metal electrodes generates heat therein, causing them to expand. Since the coefficient of expansion of the metal electrode and the ceramic insulator, into which it is mounted is dissimilar, fracturing of the ceramic insulator occurs, thereby breaking the seal originally provided between the metal electrode and the ceramic insulator permitting the gas within the housing to escape or air to enter into the housing. Although this rupture may be very minute in size, and not visible to the eye, the effectiveness of the surge arrester is destroyed and further electrical surges occurring on the transmission line will not be effectively handled by the damaged arrester, thereby causing damage to the equipment it was designed to protect.

Even if the arrester is constructed in the forms disclosed and is provided with metal electrodes with expansion coefficients closely matched to that of the cup shaped insulator, it is not consistently practicable to ensure that fracture of the insulator at or near the seals will not occur when high current discharges are passed through the electrodes and spark gaps.

An object of the present invention is to provide a multi-element arrester assembly particularly suitable for protecting sensitive equipment which is connected to a plurality of lines, e.g. the input and output of a repeater.

A further object of the present invention is to provide spark gaps across input and output lines, between input and output lines and between each line wire and ground in a common chamber, in which the gaps may be controlled in manufacture to have similar or differing breakdown voltage values according to the protection levels required for the particular equipment being protected.

Yet a further object of the present invention is to provide an arrester assembly with current carrying electrodes arranged to minimize heat transfer to the seal areas.

The present invention overcomes the shortcomings found in the prior art by providing a unique construction which utilizes a relatively small space and is readily mountable proximate the electronic equipment it is designed to protect.

SUMMARY OF THE INVENTION

A gas-filled excess voltage arrester for preventing electrical surges, according to the principles of the present invention, comprises a sealed housing having a plurality of openings provided therein. A plurality of elongated hollow insulating members having metalized bands proximate both ends thereof, has one end disposed within and cooperates with each of the housing openings and is in sealed engagement therewith. Additionally a plurality of metal end caps which are shaped to receive an insulating member therein, is in sealed engagement therewith. A plurality of elongated metal electrodes are provided. One of the electrodes is affixed to each end cap and extends through each of the hollow insulating members. The electrodes are spaced from the housing wall and from each other to define a plurality of spark gaps. An inert gaseous readily ionizable atmosphere is disposed within the sealed housing, so that breakdown of any one spark gap will cause the gas to ionize providing a low impedance path between the electrodes and the housing.

BRIEF DESCRIPTION OF THE DRAWINGS

In order that the invention may be more fully understood, it will now be described by way of example, with reference to the accompanying drawings, in which.

DESCRIPTION OF THE PREFERRED EMBODIMENTS

Figure 1:
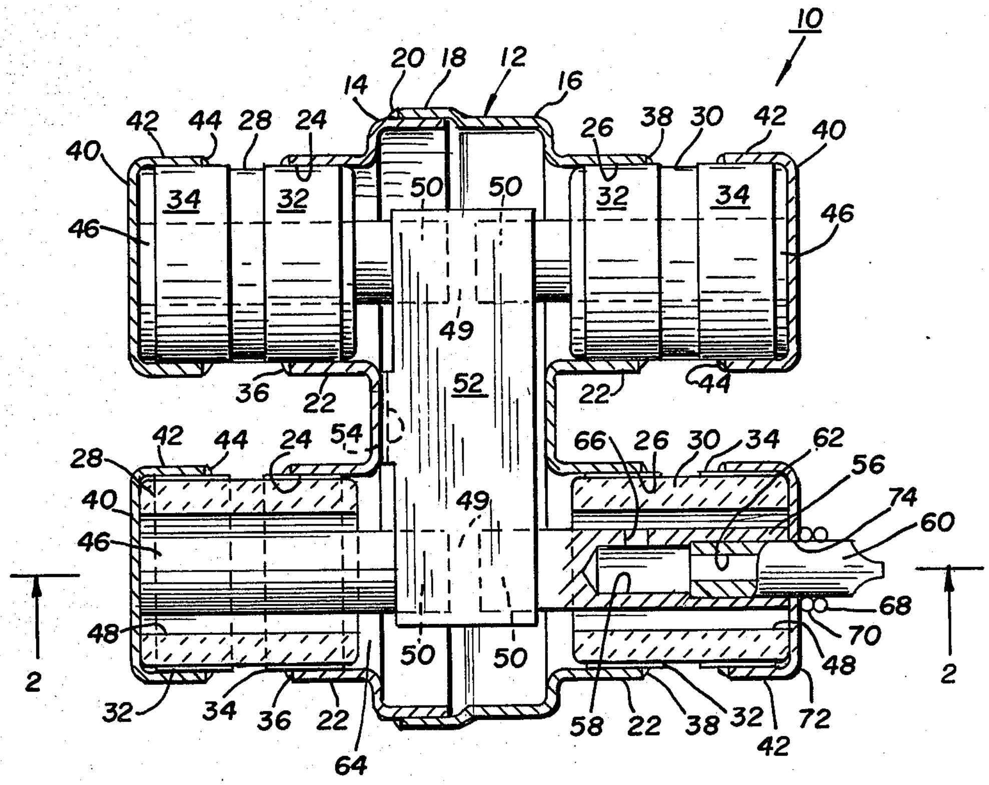
FIG. 1 is a side elevational view, partially in cross-section of a lightning arrester, according to the principle of the present invention.
Figure 2:
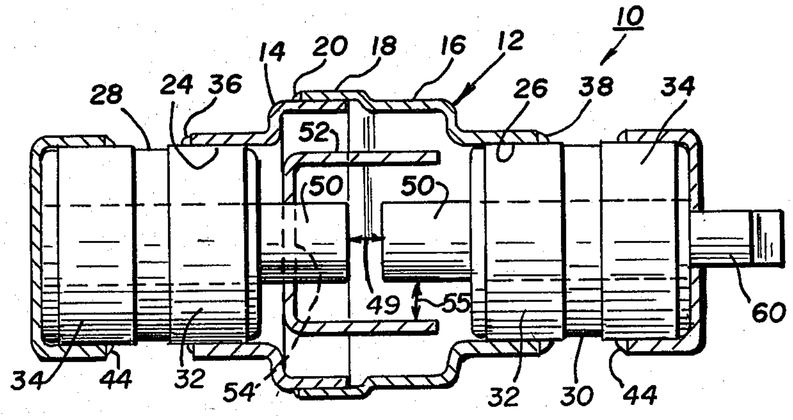
FIG. 2 is a partial cross-sectional view taken along the line 2—2 of FIG. 1.
Figure 3:
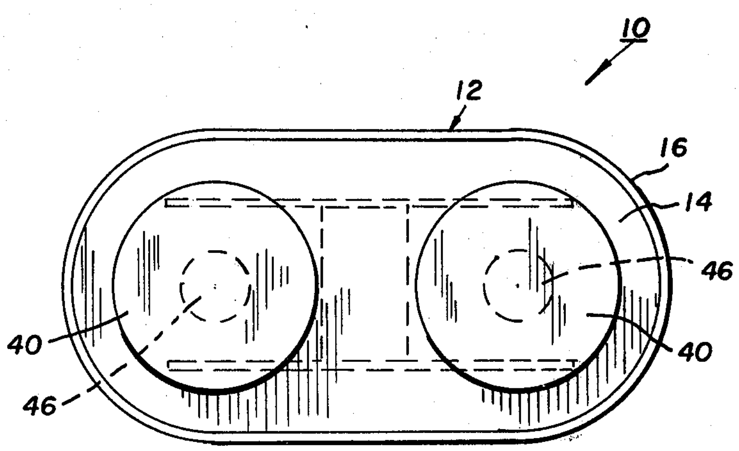
FIG. 3 is a plan view of the arrester viewed from the left side of FIG. 1.

Referring now to the drawings, and in particular to FIGS. 1, 2 and 3 which discloses an excess voltage arrester 10 that includes a housing 12 fabricated from two mating portions 14 and 16. Mating portion 16 is preferably provided with a lip 18 which permits the tight fit of mating portion 14 therein. A ring of brazing metal 20 may be placed at the edge of the lip 18 permitting the mating portions 14 and 16 of the housing 12 to be brazed together in a conventional manner.

Preferably, the housing is fabricated of a thin-walled material which permits the thin resilient sealing rings (bosses) 22 to be formed around the plurality of apertures or openings 24 and 26 provided in the housing portions 14 and 16, respectively.

A plurality of elongated hollow ceramic insulators 28 and 30 are provided with metalized bands 32 and 34 proximate the ends thereof. The coefficient of expansion of the housing portions 14 and 16, preferably is chosen such that the metal has a slightly higher temperature coefficient of expansion than insulators 28, so that after a brazing operation and cooling to room temperature, the joint will be kept under slight compression. One end of the insulator 28 is placed within the aperture 24, with the metal band 32 coming into intimate contact with the sealing bosses 22 provided in the housing mating portion 14. A ring of brazing material 36 is placed at the edge of boss 22 permitting the ceramic insulators to be brazed to the housing boss 22 in a conventional brazing operation, thereby permitting a gas tight seal therebetween. Similarly, the insulators 30 are placed within the apertures 26 provided in the housing portion 16 with the metalized bands 32 in intimate contact with the bosses 22 provided thereon. A brazing metal ring 38 is placed on the edge of boss 22 permitting the metalized band 32 to be brazed to the boss 22 in a conventional brazing operation, thereby providing a gas tight seal here also.

A plurality of end caps 40 preferably whose coefficient of expansion is similar to that of housing portions 14 and 16 are provided. Each end cap is provided with a flange portion 42 adapted to receive the metalized bands 34 deposited on the ceramic insulators 28 and 30 in a tight fitting arrangement. A brazing metal ring 44 is placed proximate the edge of the flange portion 42 and brazed in a conventional brazing operation, thereby sealing the metal end caps 40 to the ceramic insulators 28 and 30, providing a gas tight seal therebetween. Each end cap 40 is provided with an elongated metal electrode 46 centrally disposed thereon, which may be brazed or welded thereto in a conventional manner. The diameter of electrode 46 is chosen to be smaller than the internal diameter of the aperture 48 provided in the ceramic insulators 28 and 30, so that the electrode 46 does not come into contact with the inner walls of the insulators. Electrode 46 extends through the insulators 28 and 30 and is aligned to be concentric therewith, and extends inwardly into the housing 16 a specified distance so that opposing electrodes will form a prescribed gap 49 therebetween. Although the inwardly extending ends 50 of electrode 46 are shown to be flat, it is understood that a rounded or other configurations would also be acceptable for proper operation.

An additional U-shaped member 52, preferably of iron may be welded or brazed to the housing portion 14 at a point 54 where it may extend outwardly therefrom and be spaced on either side of the electrodes 46. Thus, it may be spaced from the electrodes 46 exactly the same distance as the electrodes 46 are spaced from each other forming air gaps 55 which may be similar to gap 49. This will insure that the voltage breakdown between each electrode and the housing is the same as the breakdown between opposing electrodes. Alternately, the spaces 49 between electrodes and spaces 55 between electrodes and the metallic U-shaped bracket may be modified to provide different breakdown voltages to suit different circuit requirements.

One of the plurality of electrodes 56, shown in the lower right hand corner of FIG. 1, may be provided with an aperture 58 which is adapted to receive evacuation tubing 60 therein. Evacuation tubing 60 is provided with a bore 62 which communicates with aperture 58 and communicates with the internal atmosphere 64 of the arrester housing 12, via an aperture 66 provided in the electrode 56. Brazing rings 68 and 70 are placed about the evacuation tubing 60 permitting the sealing of the evacuation tubing to the end cap 72 in a conventional manner. End cap 72 is exactly the same as end cap 40 except that it is provided with an opening 74 therein which permits the evacuation tubing to extend therethrough.

An arrester fabricated with the elements disclosed above has a distinct advantage in that the rod-like electrode end cap assemblies may be assembled with the ceramics placed in the housing portion openings with brazing metal rings being placed around the exposed edges of the metal bands of the ceramic insulators, so that the tips of the electrode can be accurately positioned. Then the two mating portions of the housing may be assembled and brazed in a suitable gas atmosphere, e.g. hydrogen/nitrogen mixture. The evacuation tubing may also be brazed into position at this time. The assembly may then be evacuated through the tube 60, and the housing filled with the final gas mixture, e.g. argon/hydrogen mixture, before sealing off the tube as shown, for example, by cold welding.

Radioactive material in gaseous form, e.g. tritium, or in solid form, may be included within the housing to speed the ionization of the gas, causing faster breakdown of the gaps. Additionally, the operating surfaces of the electrodes may be coated with material of low work function to improve the arc voltage characteristics.

Figure 4:
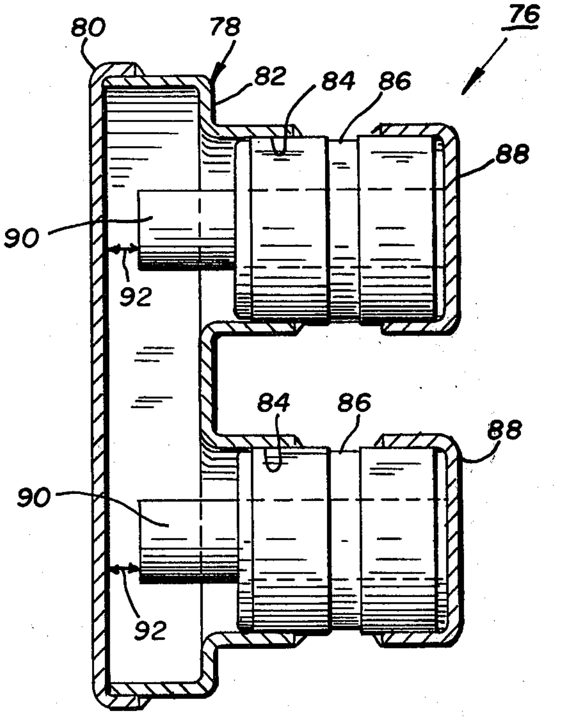
FIG. 4 is a side elevational view, partially in section of an alternate embodiment of the arrester.

An alternate embodiment of an arrester 76 is shown in FIG. 4. The alternate embodiment includes a housing 78 formed of two portions 80 and 82. Housing portion 82 is substantially the same as housing portion 16, shown in the embodiment of FIG. 1, and is adapted to receive in the openings 84 provided therein a plurality of ceramic insulators 86 which have two metallic bands deposited thereon in a manner similar to that described with regard to FIG. 1. The end caps 88 and electrodes 90 are similar to those described with regard to FIG. 1 and are fitted to the ceramic insulators 86. However, it will be noted that the housing portion 80, shown by way of example, with a flange for brazing to housing portion 82, may act as an electrode (shown flat) but may include various types of depressions in order to vary or predetermine or localize the gaps 92 provided between the electrode 90 and the housing portion 80. This configuration may be suited for various different types of mounting arrangements, where less space is available.

An assembly of this form may be assembled with brazing metal rings in position as described for FIG. 1 without requiring the separate evacuation tube described. In this form the unit is evacuated in a sealed chamber which is then filled with the required gas, e.g. argon/hydrogen mixture, at a suitable pressure. After stabilizing, the temperature of the chamber is increased to a temperature sufficient to melt the brazing metal rings to seal the device with the required gas filling within the housing 78 in a conventional manner.

This method of gas filling and brazing is an alternative to the method already described for FIG. 1, and is applicable to any of the assemblies described.

Figure 5:
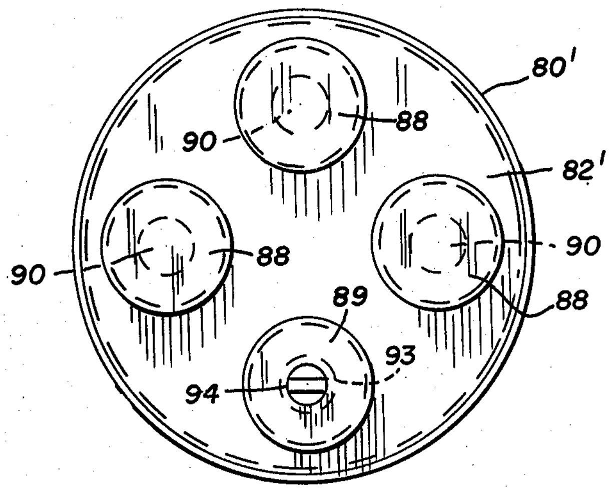
FIG. 5 is a plan view of another alternate embodiment of an arrester fabricated according to the principles of the present invention.
Figure 6:
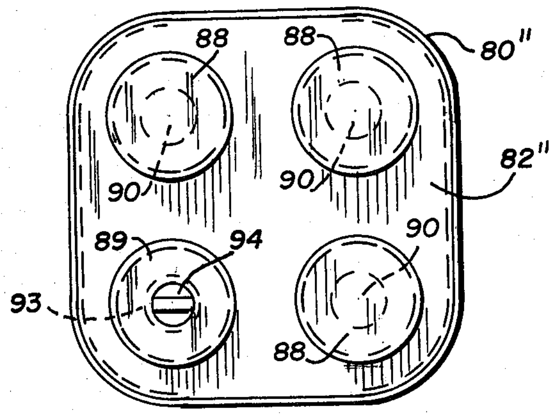
FIG. 6 is a plan view of still another alternate embodiment of the present invention.

FIGS. 5 and 6 show other configurations by way of example, with four rod-like electrodes that may be accomplished utilizing the construction similar to that shown in FIG. 4. Housing portions 80′, 80″, 82′ and 82″ represent alternative configurations to 80 and 82 of FIG. 4. End cap 89, electrode 93 and evacuation tubing 94, which are similar to those described in FIG. 1, may be used in these embodiments in order to evacuate the internal atmosphere of the housing and replace it with the final gas mixture before sealing off the tube by cold welding.

Figure 7:
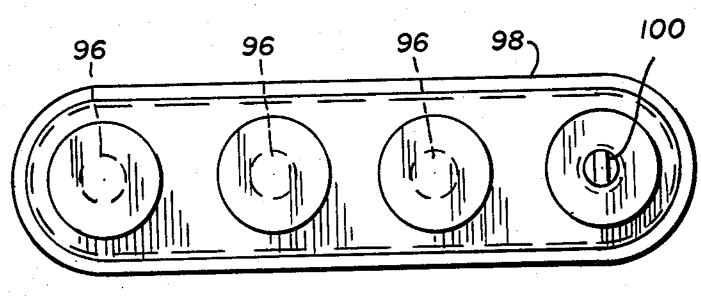
FIG. 7 is a plan view of yet another alternate embodiment of the present invention.

The embodiment shown in FIG. 7 includes a plurality of rod-like electrodes 96 disposed in a straight line within the housing 98. Here again, an evacuation tubing 100 may be used to evacuate the housing atmosphere and refill it with the final gas mixture before sealing off the tube. With this configuration the spacing between electrodes may be controlled and, in addition, the spacing between the electrode and the mating portion of the housing may be adjusted to the desired breakdown voltage.

Figure 8:
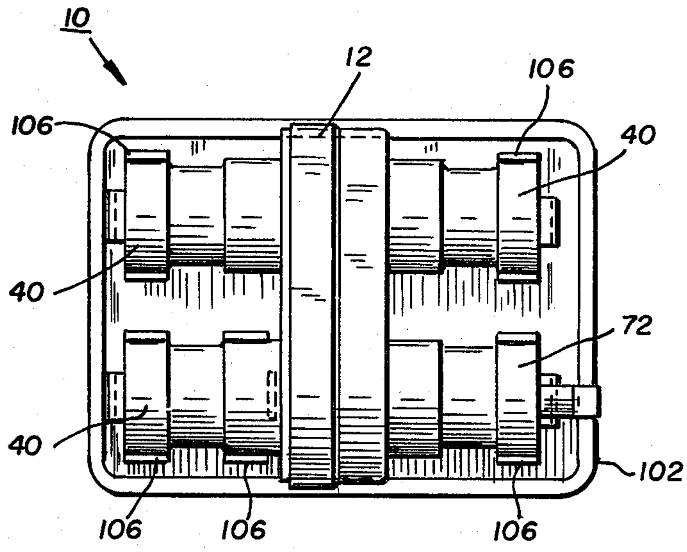
FIG. 8 is a side view of the arrester shown in FIG. 1 mounted on carrier bracket adapted for use on a printed circuit board assembly.
Figure 9:
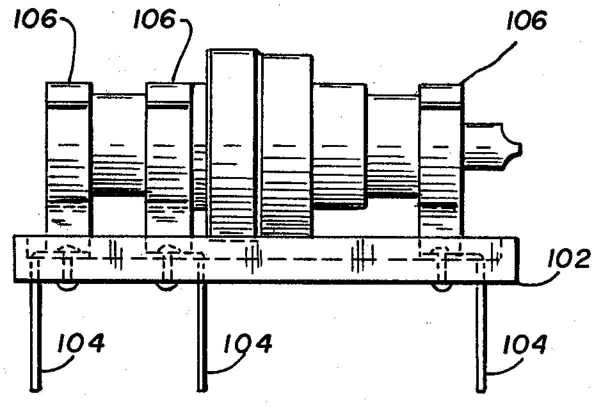
FIG. 9 is an end view in elevation of the arrester and carrier bracket shown in FIG. 8.
Figure 10:
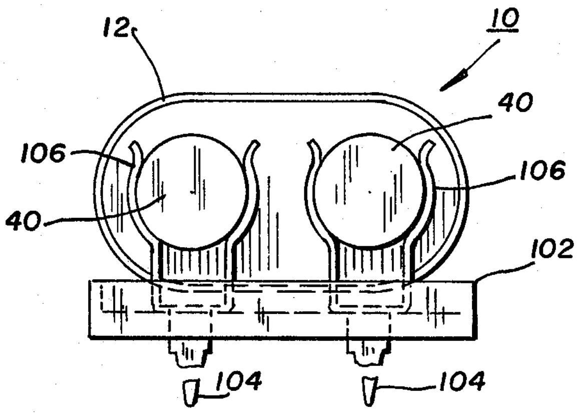
FIG. 10 is a plan view of the arrester and carrier bracket shown in FIG. 8.

FIGS. 8, 9 and 10 show various views of the arrester 10 described in FIG. 1, mounted to a carrier bracket 102 which includes a plurality of downwardly extending metal contact arms 104 that are adapted to plug into a socket or mount on a printed circuit board, not shown, and make electrical contact with the conductive paths thereon. The upper portions of the metal contact arms are secured or riveted to the insulating base plate 102 as shown and make electrical contact with, or are integral with brackets 106, which are similar to fuse clips. The brackets 106 are in intimate contact with at least one of the bosses 22 and the caps 40 and 72 of the arrester 10, functioning to hold the arrester 10 firmly on the bracket 102. In addition, the brackets 106 make electrical contact between housing 12, the caps 40 and 72, thereby providing surge voltage protection to the lines connected to the metal contact arms 104. Contact arm 104 being in contact with housing 12 may serve as the common or ground connection.

With the various embodiments set forth above, it is obvious then that a separate control of the spacing between the tips of the electrodes is possible, so that the DC breakdown voltage therebetween may be below, similar to or greater than the electrode to housing breakdown voltage. Moreover, with the configuration shown in FIG. 4, it is possible to form the housing portion, which has no electrodes mounted therein, with different spaces between the case and the electrodes mounted in the mating housing portion. Thus, depending on the dimensions and arrangements, the DC breakdown voltage between a pair of electrodes may be arranged to be approximately the sum of the DC breakdown voltages between each electrode and the housing. In the embodiment where the electrodes are equally spaced, e.g. in the round and square configurations shown in FIGS. 4, 5, 6 and 7, the electrodes may be provided with enlarged heads, permitting the electrode to housing and the certain electrode to electrode spacings and, therefore, the breakdown voltages therebetween to be similar to one another.

Hereinbefore, has been disclosed an efficient, compact and reliable means of providing an excess voltage arrester capable of protecting a plurality of electrical voltage lines from voltage surges. It will be understood that various changes in the details, materials, arrangement of parts and operating conditions which have been herein described and illustrated in order to explain the nature of the invention, may be made by those skilled in the art within the principles and the scope of the present invention.

Having thus set forth the nature of the invention, what is claimed is:

1. A gas-filled excess voltage arrester for preventing electrical surges, comprising:
 (a) a sealed housing having a plurality of non-coaxially aligned openings therein;
 (b) a plurality of elongated hollow insulating members, said insulating members being provided with metalized bands proximate both ends thereof, one end of each said insulating members cooperating with each said housing opening and in sealed engagement therein;
 (c) a plurality of metal end caps, said end caps being shaped to receive and be in sealed engagement with said insulating members;
 (d) a plurality of elongated metal electrodes, one of said electrodes being affixed to each end cap and extending through each of said hollow insulating members, said electrodes being spaced from said housing and from each other, defining a plurality of spark gaps; and
 (e) an inert gaseous readily ionizable atmosphere disposed within said sealed housing.

2. An excess voltage arrester according to claim 1 wherein said plurality of insulating members, end caps and electrodes, number four each.

3. An excess voltage arrester according to claim 1 wherein said housing includes first and second mating portions, said first housing portion having sealed therein at least two said insulating members.

4. An excess voltage arrester according to claim 3 wherein said housing first portion has all of the insulating members sealed therein and said housing second portion is spaced from said electrodes to define spark gaps.

5. An excess voltage arrester according to claim 3 or 4 wherein said insulators are equally spaced.

6. An excess voltage arrester according to claims 3 or 4 wherein said insulators are equally spaced and disposed in a straight line.

7. An excess voltage arrester according to claims 3 or 4 wherein said housing first and second portions are sealed by being brazed together.

8. An excess voltage arrester according to claim 1 wherein said sealed engagement is accomplished by brazing said insulating members to said housing and said end caps.

9. An excess voltage arrester according to claim 1 wherein one of said metal electrodes is provided with a vent hole for removing said housing atmosphere and replacing it with an inert readily ionizable gas.

10. An excess voltage arrester according to claim 1 wherein the spacings between said electrodes and the spacings between said electrodes and said housing are dissimilar.

11. An excess voltage arrester according to claim 1 wherein the spacings between said electrodes are dissimilar.

12. An excess voltage arrester according to claim 1 wherein the spacings between said electrodes and between said electrodes and said housing are essentially the same.

13. An excess voltage arrester according to claim 1 further including a metallic member affixed to said housing and equally spaced from all of said metal electrodes to provide a similar predetermined breakdown voltage between each electrode and said housing.

14. An excess voltage arrester according to claim 1 further including a carrier bracket having a plurality of downwardly extending contact arms for making electrical contact with a mating electrical circuit, said contact arms having an upper portion extending upwardly from said carrier bracket and adapted to receive and make electrical contact with said metal electrodes of said arrester.

15. A gas-filled excess voltage arrester for preventing electrical surges, comprising;

(a) a sealed housing having a plurality of non-coaxially aligned openings therein;

(b) a plurality of elongated hollow insulating members, said insulating members being provided with metallized bands proximate both ends thereof, one end of each said insulating members cooperating with each said housing opening and in sealed engagement therein;

(c) a plurality of metal end caps, said end caps being shaped to receive and be in sealed engagement with said insulating members;

(d) a plurality of elongated metal electrodes, one of said electrodes being affixed to each end cap and extending through each of said hollow insulating members, said electrodes being spaced from said housing and from each other, defining a plurality of spark gaps;

(e) an inert gaseous readily ionizable atmosphere disposed within said sealed housing; and (f) a metallic member affixed to said housing, said metallic member being equally spaced from all of said metal electrodes to provide a similar predetermined breakdown voltage between each electrode and said housing.

16. An excess voltage arrester according to claim 14 wherein said mating electrical circuit is a printed circuit board.

17. An excess voltage arrester according to claim 14 wherein said mating electrical circuit is a cooperating socket adapted to receive said downwardly extending contact arms.

* * * * *